(12) United States Patent
Faruque et al.

(10) Patent No.: US 11,084,445 B2
(45) Date of Patent: Aug. 10, 2021

(54) ENERGY-ABSORBING KNEE BOLSTER

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 16/268,717

(22) Filed: Feb. 6, 2019

(65) Prior Publication Data
US 2020/0247341 A1 Aug. 6, 2020

(51) Int. Cl.
*B60R 21/045* (2006.01)
*B60R 21/00* (2006.01)

(52) U.S. Cl.
CPC .... *B60R 21/045* (2013.01); *B60R 2021/0032* (2013.01); *B60R 2021/0051* (2013.01)

(58) Field of Classification Search
CPC .......... B60R 21/045; B60R 2021/0051; B60R 2021/0053; B60R 2021/01252
See application file for complete search history.

(56) References Cited

U.S. PATENT DOCUMENTS

| | | | | |
|---|---|---|---|---|
| 4,518,183 A * | 5/1985 | Lee | .......................... | B60R 19/40 180/271 |
| 4,951,963 A * | 8/1990 | Behr | ...................... | B60R 21/02 280/753 |
| 5,131,681 A | 7/1992 | Wetzel et al. | | |
| 5,409,260 A * | 4/1995 | Reuber | ................... | B60R 21/02 280/748 |
| 6,276,483 B1 * | 8/2001 | Sinnhuber | ............... | B60R 21/00 180/271 |
| 6,283,508 B1 * | 9/2001 | Nouwynck | ............. | B60R 21/02 280/753 |
| 6,641,166 B2 * | 11/2003 | Browne | ................ | B60R 21/013 280/752 |
| 6,752,423 B2 * | 6/2004 | Borde | ..................... | B60R 21/02 280/753 |
| 6,962,367 B2 * | 11/2005 | Muller | .................... | B60R 21/02 188/377 |
| 7,159,901 B2 * | 1/2007 | Wang | .................... | B60R 21/045 280/752 |
| 7,240,920 B2 * | 7/2007 | Motozawa | ............ | B60R 21/045 280/752 |
| 7,325,831 B2 * | 2/2008 | Justen | ..................... | B60R 21/02 280/753 |
| 7,357,216 B2 * | 4/2008 | Ishii | ....................... | B62D 3/123 180/444 |

(Continued)

FOREIGN PATENT DOCUMENTS

KR  19980048891 U  10/1998
KR  1020110055986 A  5/2011

*Primary Examiner* — Paul N Dickson
*Assistant Examiner* — Timothy Wilhelm
(74) *Attorney, Agent, or Firm* — Frank A. MacKenzie; Bejin Bieneman PLC

(57) ABSTRACT

An assembly includes a front console having a panel. The assembly includes a torsion bar fixed relative to the front console. The assembly includes a gear fixed to the torsion bar. The assembly includes a rack including teeth meshed with the gear, the rack extending toward the panel.

19 Claims, 3 Drawing Sheets

(56) References Cited

U.S. PATENT DOCUMENTS

| | | | |
|---|---|---|---|
| 7,441,624 B2* | 10/2008 | Tobata | B60R 21/013 180/271 |
| 7,494,152 B2* | 2/2009 | Schuler | B60R 21/013 280/752 |
| 7,584,995 B2* | 9/2009 | Iwasaki | B60R 21/02 280/752 |
| 7,611,086 B2* | 11/2009 | Inuzuka | B60R 22/3413 242/379.1 |
| 7,669,897 B2* | 3/2010 | Sano | B60R 21/045 280/752 |
| 7,762,577 B2* | 7/2010 | Kato | B60R 21/02 280/730.1 |
| 7,798,521 B2* | 9/2010 | Bito | B60R 21/206 280/730.1 |
| 8,210,583 B2* | 7/2012 | Wavde | B60R 19/34 293/132 |
| 8,612,053 B2* | 12/2013 | Orita | B62D 57/032 700/260 |
| 8,818,553 B2* | 8/2014 | Orita | B62D 57/00 700/245 |
| 8,924,083 B2* | 12/2014 | Yoshitake | B62D 5/0493 701/42 |
| 9,193,378 B2* | 11/2015 | Chae | B62D 5/0415 |
| 9,707,992 B2* | 7/2017 | Kiyota | B62D 5/0409 |
| 9,796,087 B2* | 10/2017 | Osada | B25J 9/1641 |
| 10,160,417 B2* | 12/2018 | Malapati | B60R 21/264 |
| 10,344,795 B2* | 7/2019 | Aoki | F16D 1/02 |
| 10,479,307 B2* | 11/2019 | Kim | B60N 2/0276 |
| 2004/0094943 A1* | 5/2004 | Fukawatase | B60R 21/045 280/753 |
| 2007/0102908 A1* | 5/2007 | Schuler | B60R 21/013 280/732 |
| 2007/0222197 A1* | 9/2007 | Makita | B60R 21/05 280/752 |
| 2009/0050399 A1* | 2/2009 | Segawa | B62D 5/0409 180/444 |
| 2014/0125043 A1* | 5/2014 | Takai | B60R 21/045 280/748 |
| 2020/0130628 A1* | 4/2020 | Zeng | B60R 21/045 |

* cited by examiner

ENERGY-ABSORBING KNEE BOLSTER

BACKGROUND

A knee bolster is a lower portion of an instrument panel in a vehicle. The knee bolster is often made of padded structures to absorb energy during a vehicle impact when a knee of an occupant impacts the knee bolster. The knee bolster is typically positioned far enough from a seat to provide sufficient legroom to the occupant, but the knee bolster is also positioned close enough to provide protection during an impact. In the event of a vehicle impact, the knee bolster may prevent "submarining," that is, when the occupant slides down the seat, which may reduce the effectiveness of other safety features, such as seatbelts and airbags.

DETAILED DESCRIPTION

Figure 1:
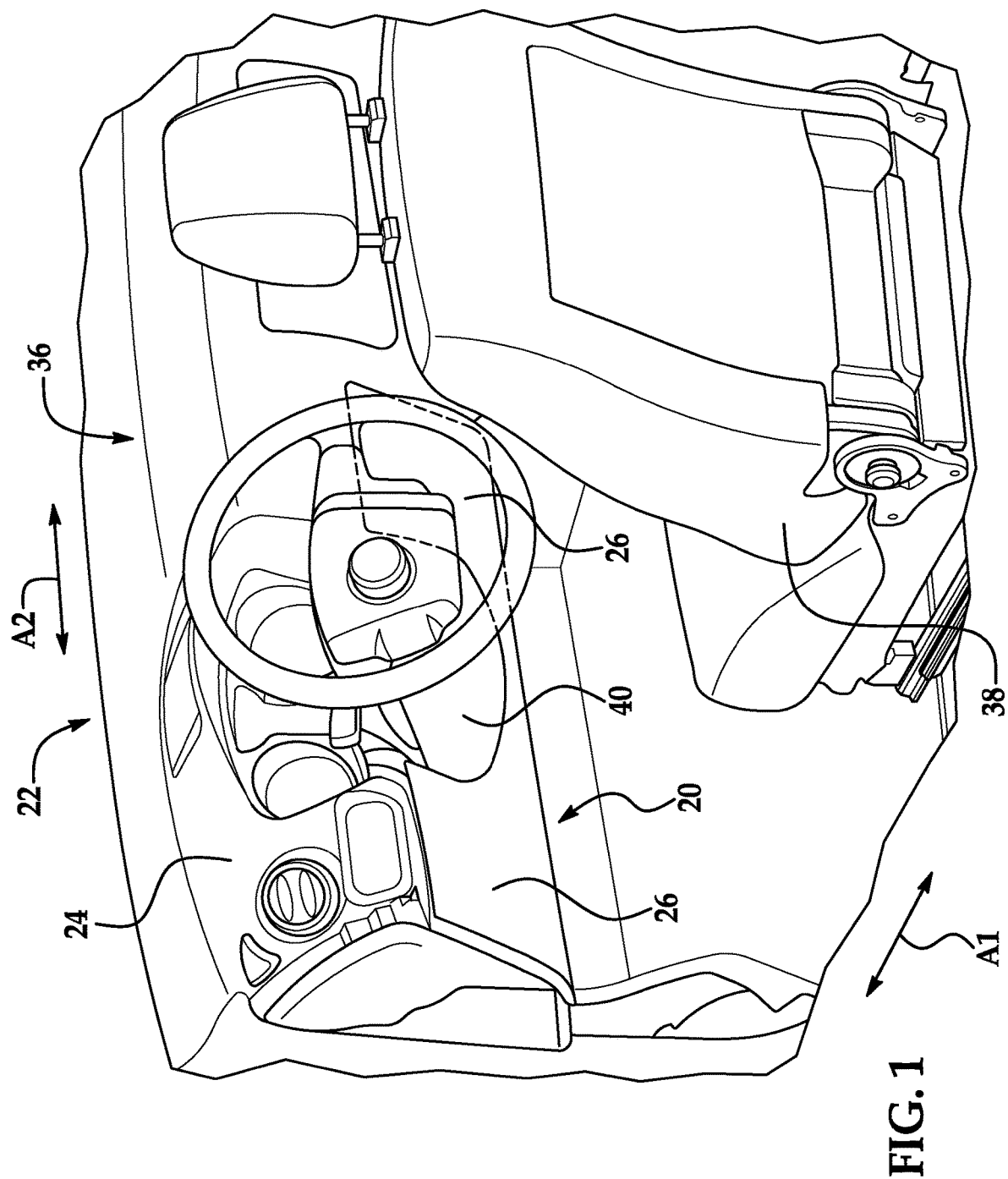
FIG. 1 is a perspective view of a vehicle passenger cabin.

An assembly includes a front console having a panel. The assembly includes a torsion bar fixed relative to the front console. The assembly includes a gear fixed to the torsion bar. The assembly includes a rack including teeth meshed with the gear, the rack extending toward the panel.

The gear and the torsion bar may be monolithic.

The assembly may include a plate fixed to the torsion bar.

The assembly may include a plate having a hole, the torsion bar within the hole.

The assembly may include a brace abutting the rack opposite the gear.

The front console may include a crossbeam, the torsion bar supported by the crossbeam.

The crossbeam and the torsion bar may be elongated parallel to each other.

The rack may be elongated transversely from the crossbeam.

The assembly may include a bracket having a first plate and a second plate having a hole, the torsion bar fixed to the first plate and extending through the hole of the second plate.

The assembly may include a brace fixed to the second plate and abutting the rack.

The bracket and the brace may be monolithic.

The second plate may be between the gear and the first plate.

The front console may include a crossbeam, the bracket fixed to the crossbeam.

The rack may extend to a distal end fixed to the panel.

The assembly may include a second panel, a second torsion bar fixed relative to the front console, a second gear fixed to the second torsion bar, and a second rack including teeth meshed with the second gear, the second rack extending toward the second panel.

The panel and the second panel may be monolithic.

The assembly may include a steering column between the rack and the second rack.

The panel may include a class-A surface.

The rack may be elongated along a vehicle-longitudinal axis.

The torsion bar may be elongated between a first end fixed to the front console and a second end free from being fixed to the front console.

With reference to the Figures, wherein like numerals indicate like parts throughout the several views, an assembly 20 for controlling kinematics of an occupant of a vehicle 22 includes a front console 24 having a panel 26. The assembly 20 includes a torsion bar 28 fixed relative to the front console 24. The assembly 20 includes a gear 30 fixed to the torsion bar 28. The assembly 20 includes a rack 32. The rack 32 includes teeth 34 meshed with the gear 30. The rack 32 extends toward the panel 26.

Force F (shown in FIGS. 3 and 4) applied to the panel 26, such as when an object impacts the panel 26 during a vehicle collision, is transferred to the rack 32. The rack 32 is urged by the force F to move relative to the torsion bar 28. The force F urging the rack 32 is transfer to the torsion bar 28 via the mesh of the rack 32 with the gear 30, applying torque T on the torsion bar 28. The torque T causes the torsion bar 28 to twist. Twisting of the torsion bar 28 absorbs energy, e.g., from the object impacting the panel 26. The assembly 20 may include more than one torsion bar 28, gear 30, and rack 32 arranged in groups. In such an example, the racks 32 may extend toward the panel 26, and other examples the assembly may include more than one panel 26 with at least one of the racks 32 extending toward the panels 26, respectively.

The vehicle 22 may be any type of passenger or commercial automobile such as a car, a truck, a sport utility vehicle, a crossover vehicle, a van, a minivan, a taxi, a bus, etc. The vehicle 22 defines a vehicle-longitudinal axis A1, i.e., extending between a front and a rear of the vehicle 22. The vehicle 22 defines a cross-vehicle axis A2, i.e., extending between a left side and a right side of the vehicle 22. The vehicle-longitudinal axis A1 and the cross-vehicle axis A2 are perpendicular to each other. The front, rear, left and right sides, and relative directions used herein (such forward, rearward, upward, downward, etc.) may be relative to an orientation of an occupant of the vehicle 22. The front, rear, left and right sides, and relative directions used herein may be relative to an orientation of controls for operating the vehicle 22, e.g., a steering wheel, etc. The front, rear, left and right sides, and relative directions used herein may be relative to a driving direction of the vehicle 22 when wheels of the vehicle are all parallel with each other.

The vehicle 22 includes a passenger cabin 36. The passenger cabin 36 includes one or more seats 38. The seats 38 are shown as bucket seats, but the seats 38 may be other types. The seats 38 may face the front console 24. In other words, a seat bottom of the seat 38 may extend from a seat back of the seat 38 toward the front console 24.

The front console 24 is disposed at a forward end of the passenger cabin 36 and faces toward the seats 38. The front console 24 may be elongated along the cross-vehicle axis A2. For example, the front console 24 may be an instrument panel that includes one or more instruments such as gauges, displays, etc. The front console 24 may include vehicle controls, such as a steering wheel, a touch screen interface, button, nobs, switches, etc.

The front console 24 may include a steering column 40. The steering column 40 supports the steering wheel. The steering column 40 transfers rotation of the steering wheel to movement of a steering rack of the vehicle 22. The steering column 40 may include a shaft connecting the steering wheel to the steering rack.

Figure 2:
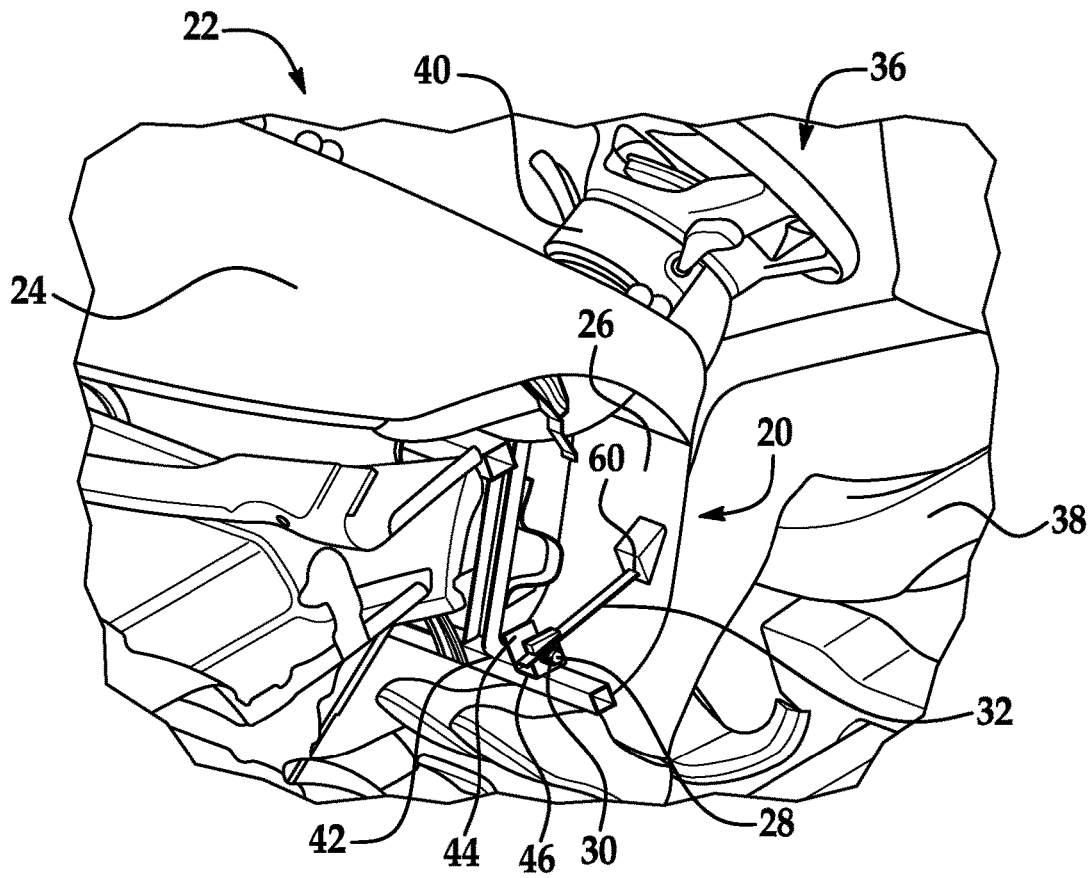
FIG. 2 is a cut away perspective view of the vehicle passenger cabin showing an energy absorbing assembly
Figure 3:
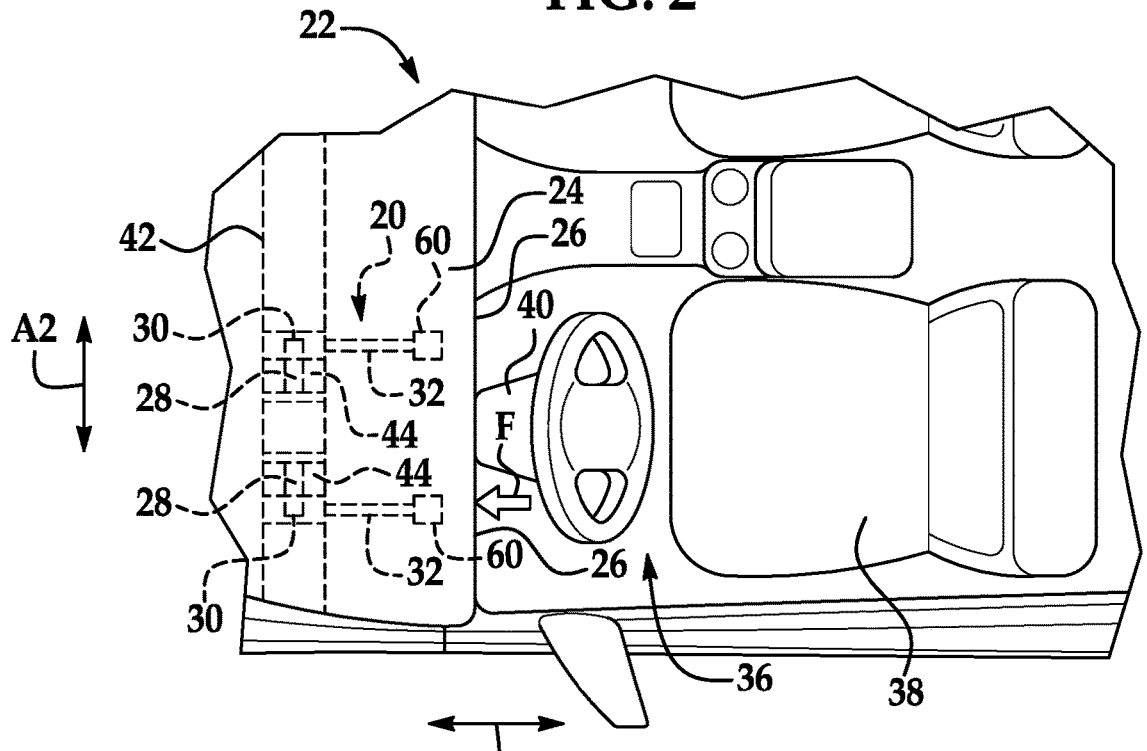
FIG. 3 is a top view of the vehicle passenger cabin and the energy absorbing assembly.
Figure 4:
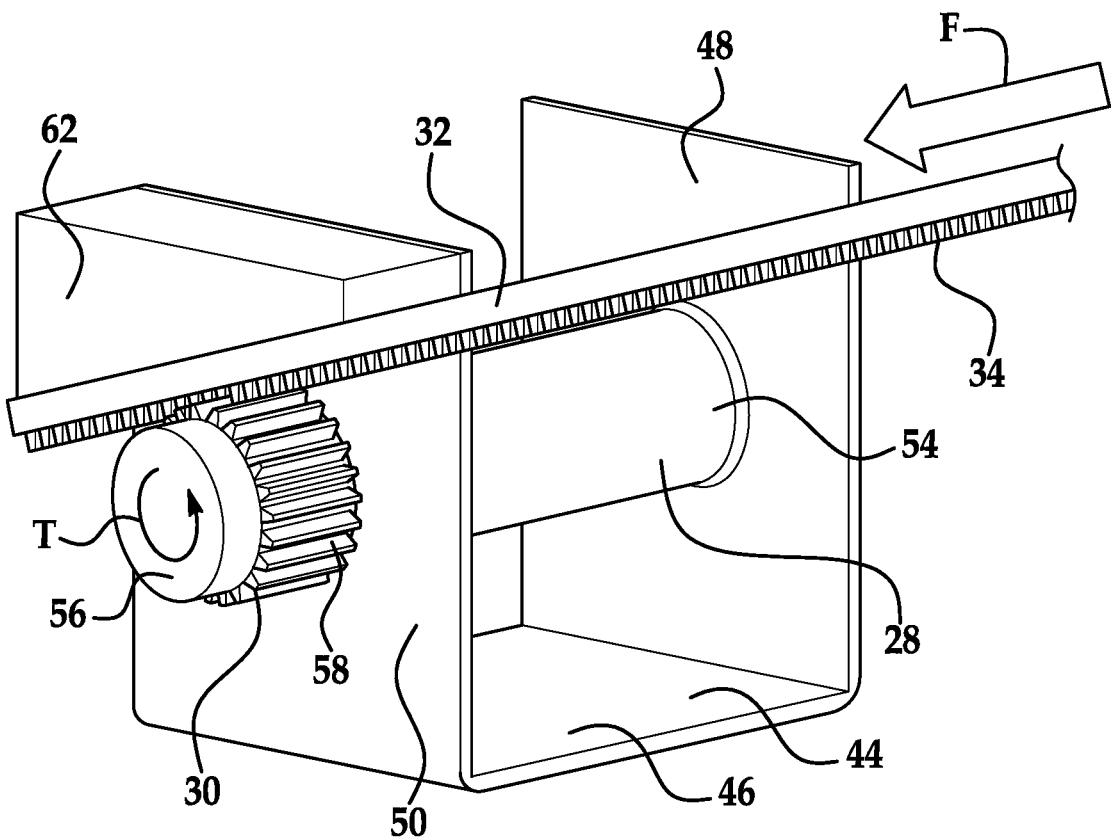
FIG. 4 is a perspective view of components of the energy absorbing assembly.

The front console 24 may include a crossbeam 42 (shown in FIGS. 2 and 3). The crossbeam 42 may extend below and/or behind the panels 26 of the front console 24. The crossbeam 42 may be a part of a frame of the vehicle 22 or may be connected to the frame of the vehicle 22. The crossbeam 42 may provide lateral structural support for the vehicle 22. The crossbeam 42 may extend laterally, i.e., along the cross-vehicle axis A2, fully across the passenger cabin 36. Other components, such as the panels 26, vehicle controls, airbags, etc., may be supported by the crossbeam 42. The crossbeam 42 may have a tubular shape with, e.g., a rectangular or square cross-section. The crossbeam 42 may be steel, aluminum, etc.

The panels 26 cover internal components of the front console 24. For example, the panels 26 may hide the crossbeam 42, airbags, etc., of the front console 24 from view of an occupant of the passenger cabin 36. The panels 26 may be formed of, e.g., plastic such as polypropylene. The panels 26 may be disposed between the rack 32 and the seats 38. The panels 26 may face the seats 38. The panels 26 may be located in a vehicle-forward direction from one of the seats 38. The seats 38 may face the panels 26. The panels 26 may be located in a vehicle-forward direction from a knee of an occupant of one of the seats 38, assuming the occupant is approximately the size of a 50th percentile anthropomorphic testing device. The panels 26 may include class-A surfaces, i.e., surfaces specifically manufactured to have a high quality, finished aesthetic appearance free of blemishes. The class-A surfaces may face the seats 38. Panels 26 may be located on opposite sides of the steering column 40. In other words, the steering column 40 may be between one panel 26 and another panel 26 along the cross-vehicle axis A2. The panels 26 may be monolithic, i.e., a one-piece unit without any fasteners, joints, welding, adhesives, etc., fixing the panels 26 to each other.

Figure 5:
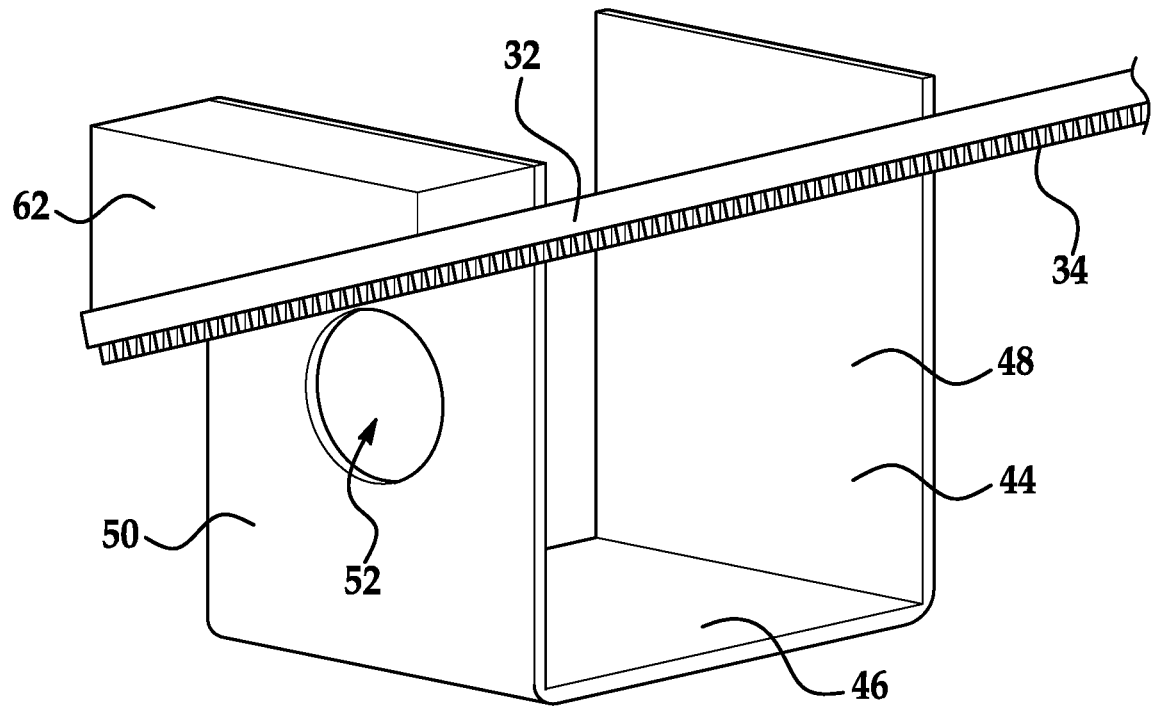
FIG. 5 is a perspective view of components of the energy absorbing assembly.

The front console 24 may include one or more brackets 44. Each bracket 44 may support one the torsion bars 28. Each bracket 44 may include a base 46 (shown in FIGS. 4 and 5). Each bracket 44 may have a first plate 48 and a second plate 50 extending transversely from the base 46. For example, the first plate 48 and the second plate 50 may extend perpendicularly from the base 46. The first plate 48 and the second plate 50 may be spaced from each other. The second plate 50 may have a hole 52 (shown in FIG. 5). The hole 52 may be sized to receive the torsion bar 28. For example, a diameter of the hole 52 may be greater than a diameter of the torsion bar 28. The base 46, the first plate 48, and the second plate 50 may be monolithic. The bracket 44 may be metal or any other suitable material. Each bracket 44 may be fixed to the crossbeam 42. For example, the base 46 may be fixed to the crossbeam 42, e.g., via welding, fastener, etc. The adjectives "first" and "second" are used throughout this document as identifiers and are not intended to signify importance or order.

The torsion bar 28 elastically and/or plasticly deforms to absorb energy, e.g., upon application of force. The torsion bar 28 may be rod having a circular cross section. The torsion bar 28 may be elongated between a first end 54 and a second end 56. The torsion bar 28 may be elongated along the cross-vehicle axis A2. The torsion bar 28 and the crossbeam 42 may be elongated parallel to each other. The torsion bar 28 is fixed relative to the front console 24. The torsion bar 28 may be supported by the crossbeam 42. For example, the first end 54 may fixed to the front console 24, e.g., the first end 54 of the torsion bar 28 may be fixed to the first plate 48 of the bracket 44 via welding, fastener, etc. The torsion bar 28 may be within the hole 52 of the second plate 50. For example, the torsion bar 28 may extend from the first plate 48 through the hole 52 of the second plate 50. The second end 56 of the torsion bar 28 may be free from being fixed to the front console 24. For example, the second end 56 may be free from be fixed to the bracket 44. As another example, the second end 56 may be rotatable within the hole 52 of the second plate 50, e.g., when the torsion bar 28 twists in response to an application of force F. The second end 56 of the torsion bar 28 may extend away from the first plate 48 beyond the second plate 50.

The gear 30 transfers force F, e.g., from the rack 32, into torque T, e.g., applied to the torsion bar 28. The gear 30 includes teeth 58. The gear 30 is fixed to the torsion bar 28. For example, the gear 30 may be fixed to the torsion bar 28 via welding, fastener, etc. As another example, the gear 30 and the torsion bar 28 may be monolithic. The gear 30 may be fixed to the second end 56 of the torsion bar 28. The gear 30 may be outside the spacing between the first plate 48 and the second plate 50. In other words, the second plate 50 may be between the gear 30 and the first plate 48.

The rack 32 transfers force F from the panel 26 to the torsion bar 28, e.g., via the gear 30. The rack 32 may be an elongated linear beam. The rack 32 may be elongated transversely from the crossbeam 42. For example, the rack 32 may be perpendicular to the crossbeam 42. As another example, the rack 32 may be elongated along the vehicle-longitudinal axis A1. The rack 32 extends from the torsion bar 28 toward the panel 26. For example, the rack 32 may extend to a distal end 60 that is fixed to the panel 26. The distal end 60 may be fixed to the panel 26 via fastener, adhesive, etc. The rack 32 includes teeth 34. The teeth 34 may be along the elongation of the rack 32. The teeth 34 of the rack 32 are meshed with the teeth 58 of the gear 30, e.g., to transfer force F and motion therebetween.

The assembly 20 may include a brace 62 that supports the rack 32 relative to the gear 30, e.g., to maintain the teeth 34 of the rack 32 in mesh with the teeth 58 of the gear 30. The brace 62 may abut the rack 32 opposite the gear 30. In other words, the rack 32 may abut the brace 62 and be between the gear 30 and the brace 62. The brace 62 may extend from the second plate 50 of the bracket 44, e.g., away from the first plate 48. The brace 62 may be fixed to the second plate 50 of the bracket 44. For example, the brace 62 may be fixed to the second plate 50 of the bracket 44 via welding, fastener, etc. As another example, the second plate 50 the bracket 44 and the brace 62 may be monolithic.

The torsion bars 28, gears 30, and racks 32 may be positioned to absorb energy from multiple panels 26. For example, one torsion bar 28, gear 30, rack 32, etc., may be positioned to absorb energy from one of the panels 26, and another torsion bar 28, gear 30, rack 32, etc., may be positioned to absorb energy from another of the panels 26. As another example, the steering column 40 may be between one torsion bar 28, gear 30, rack 32, etc., and another torsion bar 28, gear 30, rack 32, etc., e.g., along the cross-vehicle axis A2.

In the event of a frontal impact, an occupant of the seat 38 has forward momentum relative to the rest of the vehicle 22. The forward motion of the occupant may be limited by restraint systems such as seatbelts or airbags (not shown). A knee of the occupant may impact each of the panels 26, e.g., one knee on each side of the steering column 40. As the knee pushes the panel 26 forward, the rack 32 is urged toward the front of the vehicle 22. Force F from the rack 32 is transferred to the torsion bar 28 via the mesh of the teeth 34 of the rack 32 with the teeth 58 of the gear 30. The force F is applied as torque T to the torsion bar 28, causing the torsion bar 28 to twist, absorbing energy from the impact between the knee and the panel 26.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a front console having a panel;
   a torsion bar fixed relative to the front console, the torsion bar elongated between a first end fixed to the front console and a second end free from being fixed to the front console;
   a gear fixed to the torsion bar; and
   a rack including teeth meshed with the gear, the rack extending toward the panel.

2. The assembly of claim 1, wherein the gear and the torsion bar are monolithic.

3. The assembly of claim 1, further comprising a plate fixed to the torsion bar.

4. The assembly of claim 1, further comprising a plate having a hole, the torsion bar within the hole.

5. The assembly of claim 1, further comprising a brace abutting the rack opposite the gear.

6. The assembly of claim 1, wherein the front console includes a crossbeam, the torsion bar supported by the crossbeam.

7. The assembly of claim 6, wherein the crossbeam and the torsion bar are elongated parallel to each other.

8. The assembly of claim 6, wherein the rack is elongated transversely from the crossbeam.

9. The assembly of claim 1, further comprising a bracket having a first plate and a second plate having a hole, the torsion bar fixed to the first plate and extending through the hole of the second plate.

10. The assembly of claim 9, further comprising a brace fixed to the second plate and abutting the rack.

11. The assembly of claim 10, wherein the bracket and the brace are monolithic.

12. The assembly of claim 9, wherein the second plate is between the gear and the first plate.

13. The assembly of claim 9, wherein the front console includes a crossbeam, the bracket fixed to the crossbeam.

14. The assembly of claim 1, wherein the rack extends to a distal end fixed to the panel.

15. The assembly of claim 1, further comprising a second panel, a second torsion bar fixed relative to the front console, a second gear fixed to the second torsion bar, and a second rack including teeth meshed with the second gear, the second rack extending toward the second panel.

16. The assembly of claim 15, wherein the panel and the second panel are monolithic.

17. The assembly of claim 15, further comprising a steering column between the rack and the second rack.

18. The assembly of claim 1, wherein the panel includes a class-A surface.

19. The assembly of claim 1, wherein the rack is elongated along a vehicle-longitudinal axis.

* * * * *